United States Patent
Re

(10) Patent No.: US 11,633,980 B2
(45) Date of Patent: Apr. 25, 2023

(54) WHEEL HUB UNIT WITH IMPROVED DRAINAGE

(71) Applicant: AKTIEBOLAGET SKF, Gothenburg (SE)

(72) Inventor: Paolo A Re, Nichelino (IT)

(73) Assignee: AKTIEBOLAGET SKF

(*) Notice: Subject to any disclaimer, the term of this patent is extended or adjusted under 35 U.S.C. 154(b) by 0 days.

(21) Appl. No.: 17/476,778

(22) Filed: Sep. 16, 2021

(65) Prior Publication Data

US 2022/0088964 A1 Mar. 24, 2022

(30) Foreign Application Priority Data

Sep. 23, 2020 (IT) .................. 102020000022318

(51) Int. Cl.
*B60B 27/00* (2006.01)
*F16C 33/80* (2006.01)
*F16C 33/78* (2006.01)

(52) U.S. Cl.
CPC ...... *B60B 27/0073* (2013.01); *F16C 33/7823* (2013.01); *F16C 33/805* (2013.01); *B60B 2900/511* (2013.01); *F16C 2326/02* (2013.01)

(58) Field of Classification Search
CPC .... F16C 33/80; F16C 33/805; F16C 2326/02; F16C 33/7823; B60B 27/0073; B60B 2900/211; B60B 2900/511
See application file for complete search history.

(56) References Cited

U.S. PATENT DOCUMENTS

| 8,303,190 | B2 | 11/2012 | Shigeoka |
| 2012/0177315 | A1 | 7/2012 | Matsuki et al. |
| 2013/0243360 | A1* | 9/2013 | Takimoto ............... F16C 33/783 |
| | | | 384/486 |

(Continued)

FOREIGN PATENT DOCUMENTS

| JP | 2011226620 | 11/2011 |
| JP | 2012131452 | 7/2012 |

(Continued)

OTHER PUBLICATIONS

Machine Translation of JP-2012219971-A (Year: 2012).*
Search Report for corresponding Italian Patent Application No. 102020000022318 dated Jun. 8, 2021.

*Primary Examiner* — Alan B Waits
(74) *Attorney, Agent, or Firm* — Reed Smith LLP

(57) ABSTRACT

A wheel hub unit provided with a radially outer ring, stationary in use, a radially inner ring, rotating in use, at least one row of rolling elements, interposed between the radially outer ring and the radially inner ring, and a sealing assembly, interposed between the radially outer ring and the radially inner ring, which defines cooperating with the radially outer ring or with the radially inner ring a shield of at least one labyrinth seal. The labyrinth seal does not have a circumferential symmetry but comprises an upper portion and a lower portion with respect to a symmetry axis (A) of the wheel hub unit and is provided with an angular interruption of the shield made on its lower portion corresponding to the lower side of the wheel hub unit so as to increase an outflow section thereof from the labyrinth seal itself which facilitates gravity drainage of contaminants present inside the sealing assembly.

7 Claims, 3 Drawing Sheets

(56) References Cited

U.S. PATENT DOCUMENTS

2016/0178010 A1* 6/2016 Kaiser ................ F16C 33/7896
277/351

FOREIGN PATENT DOCUMENTS

| JP | 2012219971 A | * 11/2012 | ............ F16C 33/805 |
| JP | 2014040904 | 3/2014 | |
| JP | 2015040626 | 3/2015 | |
| WO | 2013031904 | 3/2013 | |

* cited by examiner

WHEEL HUB UNIT WITH IMPROVED DRAINAGE

CROSS-REFERENCE RELATED APPLICATIONS

This application is based on and claims priority to Italian Patent Application No. 102020000022318 filed on Sep. 23, 2020, under 35 U.S.C. § 119, the disclosure of which is incorporated by reference herein.

TECHNICAL FIELD

The present application generally relates to a vehicle wheel hub unit with improved drainage. In particular, the wheel hub unit has improved drainage at a sealing assembly with which rolling bearings of the wheel hub unit are equipped.

BACKGROUND

The sealing assemblies intended to be fitted in the rolling bearings of wheel hub units at the flange supporting the wheel, referred to as "outer" or "outboard", such as those described in U.S. Pat. No. 8,303,190 and US Publication 2012/0177315 for example, are composed of "cassette" gaskets including a first and a second annular screen. The first and second annular screens each generally include an L-shaped radial section, mounted one in front of the other so as to delimit between the screens an annular chamber in which are arranged a number of sealing lips carried by an annular gasket solidly fixed to one of the screens, generally the screen which is intended to be stationary in use. Access to this chamber by external contaminants (water, mud, dust) is limited by a special shape of the flange portions of one or both of the screens, which also cooperate, very closely, with radially outer portions of the outer or inner ring of the bearing and/or elements of the wheel hub rigidly secured thereto, forming labyrinth seals.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

In certain embodiments disclosed herein, a wheel hub unit has improved drainage at a sealing assembly with which rolling bearings of the wheel hub unit are equipped.

Figure 1:
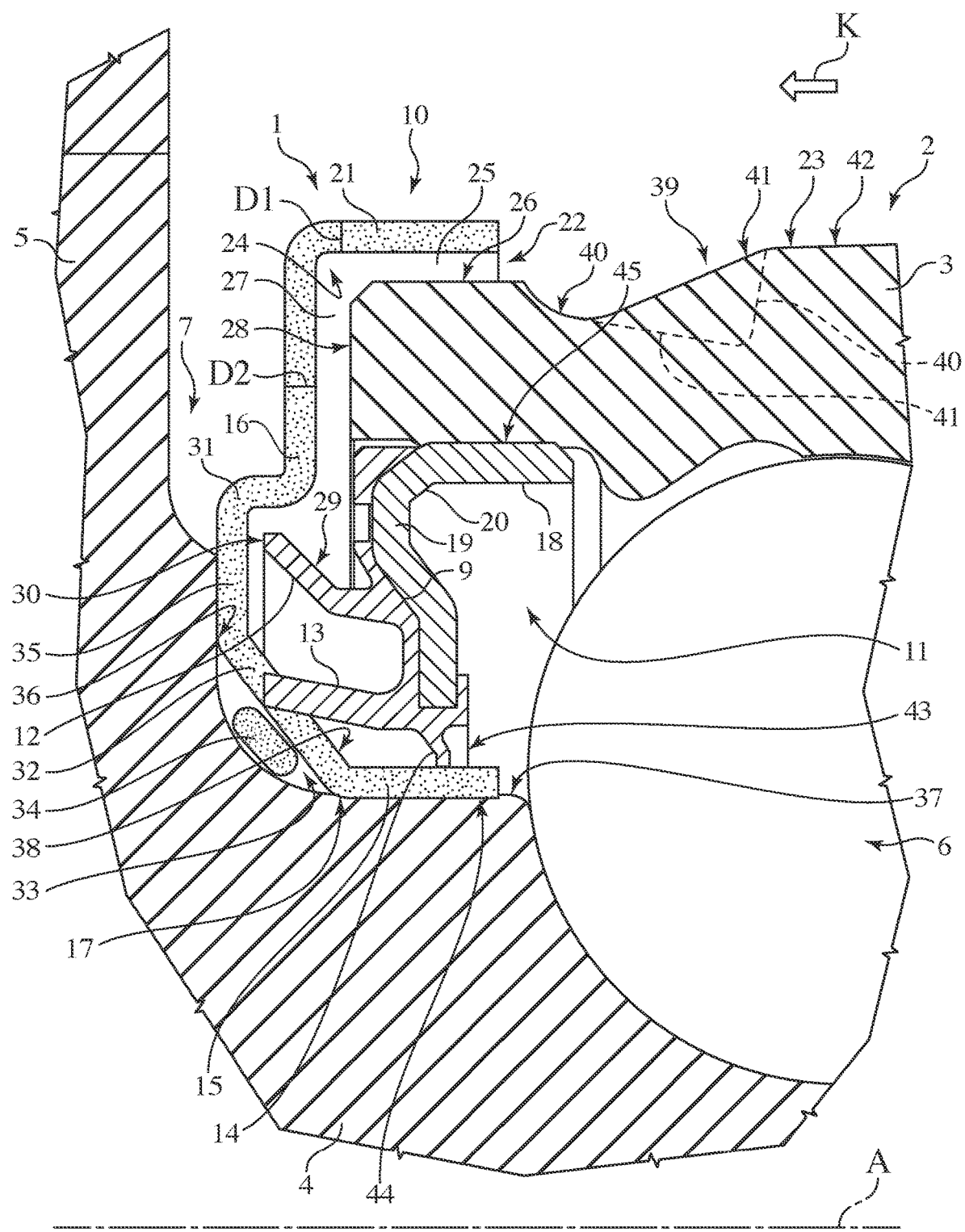
FIG. 1 shows, in schematic form and radially sectioned, a sealing assembly applied to a wheel hub unit.

Improved sealing assemblies have been produced which reduce the friction caused by the considerable interference from rubbing lips. Such sealing assemblies, an example of which is shown in FIG. 1, have appropriate labyrinth seals that ensure a seal against contaminants without requiring considerable interference from rubbing lips.

However, this known solution presents problems in terms of drainage of mud and contaminants. In working conditions, the labyrinth seals are exposed to the flow of mud, normally coming from above and from the sides. The sealing assembly is designed to prevent mud from entering the first chamber of the labyrinth. However, since this sealing system has axial symmetry, drainage at the bottom may be insufficient to allow the mud to exit the chamber. Therefore, mud becomes trapped, resulting in the sealing assembly not functioning properly.

One solution to this problem is to use bigger "gaps" in the labyrinth seals, for example by designing one of the elements that creates the labyrinth seal with a bend having a greater radius of curvature and a slope. Thus, drainage at the bottom of the wheel hub unit is improved, but the volume of the containment chamber of the labyrinth is thereby reduced over 360 degrees and, consequently, the sealing assembly fills up with mud more readily.

There is therefore a need to design a wheel hub unit that can use a low-friction sealing assembly like that described above, and that has features allowing good drainage of mud, and of contaminants in general, without negatively affecting the containment capacity of the sealing assembly itself.

With reference to FIG. 1, a low-friction sealing assembly 1, in particular designed to be fitted to a wheel hub unit 2 of a vehicle, is shown, the sealing assembly 1 of which forms an integral part thereof in use.

An exemplary wheel hub unit 2 comprises an outer ring 3, stationary in use, an inner ring 4, rotating in use about an axis A, which is also the axis of symmetry of both rings 3 and 4, and at least one row of rolling elements 6 interposed between the outer ring 3 and the inner ring 4, which are mutually coaxial. The ring 4 has a flanged end 5 opposite to the outer ring 3 and intended to carry a vehicle wheel.

The sealing assembly 1 may be inserted in an annular space 7 delimited between the rotating inner ring 4 and the stationary outer ring 3 of the wheel hub 2 and, more generally, between the rotating element 4 and the stationary element 3, which are mutually coaxial, of a generic rolling bearing of any known type forming part of, or integrated in, the wheel hub unit 2.

The sealing assembly 1 is interposed between the rings 3 and 4, inserted in the annular space 7, protecting the rolling elements 6 arranged between the stationary element 3 and the rotating element 4. The sealing assembly 1 comprises: a first annular screen 10 made by cutting and stamping a stainless steel sheet, a second annular screen 11 also made by cutting and stamping a stainless steel sheet, arranged facing the screen 10. The annular gasket 9 is made of one or more elastomeric materials, rigidly secured to the screen 11 and having a plurality of sealing lips 12, 13, 14 that cooperate, as will be seen below, with the screen 10 to make the annular space 7 fluid-tight towards the rolling elements 6.

The screen 10 is provided with a first sleeve portion or, more generally, cylindrical portion, 15 which in use is rigidly secured to the rotating element 4, and with a first flange portion 16. First flange portion 16 projects radially from the first sleeve portion 15 in the direction away from the axis A, and therefore radially outwards, from an end 17 of the first sleeve portion 15 which faces the flanged end 5.

The screen 11 is provided with a second sleeve portion or, more generally, cylindrical portion, 18 which in use is rigidly secured to the stationary element 3, and with a second flange portion 19 projecting radially from the second sleeve portion 18 in the opposite direction to the first flange portion 16 and facing the latter; the second flange portion 19 therefore extends radially inwards, towards the axis A and towards the first sleeve portion 15, from an axial end 20 of the second sleeve portion 18 which faces, in the non-limiting example shown, the screen 10 and the flanged end 5.

The lips 12 and 13 of the annular gasket 9 project axially and radially from the second flange portion 19 towards the first flange portion 16, obliquely to the second flange portion 19, in the direction moving away from the axis A; furthermore, the first flange portion 16 terminates, at the opposite end to the sleeve portion 15, in its radially outer peripheral annular segment 21, which in use projects radially and axially outside the annular space 7 so as to define with the stationary element 3 a first labyrinth seal 22.

In this case, the first flange portion 16 extends radially outside the annular space 7, projecting radially with respect to a radially outer lateral surface 23 of the ring 3.

Its annular end segment 21 is defined/formed by an edge, bent at a right angle, of the first flange portion 16 defining, in radial section, with the rest of the first flange portion 16, an L turned towards the axis A.

This edge 21 bent at a right angle delimits, in use, in radial section, together with the first flange portion 16 and the stationary element 3, an L-shaped channel 24 having, according to the main aspect of the example embodiment, a width which is substantially constant, but not necessarily the same, in radial and axial extension.

The L-shaped channel 24 comprises a first branch 25 forming the labyrinth seal 22 and delimited between the annular segment or edge 21 bent at a right angle of the first flange portion 16 and a first cylindrical segment 26 of the lateral surface 23 of the outer ring 3, and a second branch 27 arranged at a right angle to the branch 25, delimited between the first flange portion 16 and a flat front surface 28 of the stationary element or outer ring 3 in the direction towards the rotating element or inner ring 4.

The L-shaped channel 24 emerges in an annular recess 29 the concavity of which faces the bent edge 21, and which is delimited between the screen 11 and the lip 12; the lip 12 is the first radially outermost lip, i.e. the lip furthest from the axis A, of the annular gasket 9 and extends obliquely with respect to the first flange portion 16, in the direction away from the first sleeve portion 15 so as to cooperate with the first flange portion 16, with which it thus defines a second labyrinth seal 30.

The first flange portion 16 may have an intermediate right-angled bend 31 defining in radial section an L facing, on the opposite side, the L defined by the edge 21 bent preferably at a right angle; the bend 31 is positioned at the mouth of the annular recess 29 in the L-shaped channel 24 of constant width and projects axially above the concavity of the annular recess 29, so as to form a dripstone which, in use, can guide any external contaminants that get past the first labyrinth seal 22 into said annular recess 29.

The first flange portion 16 terminates, at the end towards the sleeve portion 15, in a second annular segment 32 arranged obliquely with respect to the sleeve portion 15 and extending axially in the same direction as the first annular segment or edge 21 bent at a right angle, so as to delimit, on the opposite side to the sleeve portion 15, a frustoconical cavity 33 which, in use, is filled with a water repellent substance 34.

A third annular segment 35 of the first flange portion 16 is arranged between the second annular segment 32 and the intermediate bend 31 preferably at a right angle and takes the form of a flat annular segment which, in use, can hit against an axial shoulder 36 of the rotating element 4 (in the example shown, defined by the flanged end 5) and can in turn serve as a mounting shoulder for pressing the screen 10 on a radially outer cylindrical lateral surface 37 of the rotating element defined by the inner ring 4.

In practice, the first flange portion 16 is shaped so as to extend in the direction away from the first sleeve portion 15, both axially (optional as in the specific example shown) and radially, via the annular segment 32, it then continues, perpendicularly to the sleeve portion 15, in the direction away from the latter, and only radially, via the annular segment 35, it extends back towards the first sleeve portion 15 by means of the bend 31, it then extends, only radially, in the direction away from the first sleeve portion 15, extending parallel to the annular segment 35 and it terminates in the edge bent at a right angle 21, which extends parallel to the first sleeve portion 15, in a position facing the first sleeve portion 15.

The lip 13 is the second lip, moving in the radial direction, of the annular gasket 9 and, according to the example embodiments, it cooperates by rubbing, fluid-tightly, with the annular segment 32, which defines towards the lip 13 and the screen 11 a conical sealing surface 38 the conicity of which faces the screen 11, i.e. it converges towards the axis A on the side of the screen 11.

In FIG. 1, the lip 13 is not shown to scale to facilitate comprehension, and partially in dotted line, in undeformed configuration.

The sealing assembly 1 further comprises an annular groove 39 which is carried by the stationary element 3. The annular groove 39 is made in the lateral surface 23, generally of cylindrical shape, of the stationary element or outer ring 3, adjacent to the edge 21 bent at a right angle, and is delimited, in the axial direction, by a curved segment 40 along which the groove 39 gets deeper in the direction towards the rotating element 4 and the axis A, and, immediately thereafter, by a straight segment 41 defining a flat slope along which the depth of the groove 39 decreases to zero.

The annular groove 39 is shaped such that the concavity of the curved segment 40 faces the side from which, in use, possible external contaminants arrive, shown schematically by the arrow K; the concavity of the curved segment 40 preferably faces away from the rotating element 4, as shown by the continuous line in FIG. 1. However, the groove 39 may also have a different shape, in particular if the expected direction of arrival of the contaminants is different, as shown in dotted line in FIG. 1.

The third lip 14 of the annular gasket 9 is a lip referred to as a grease seal, extending obliquely towards the first sleeve portion 15. The lip 14 preferably cooperates, without rubbing, with the first sleeve portion 15 so as to form a seal 43. The grease seal lip 14 may however also be such that it rubs on the first sleeve portion 15.

The first and second sleeve portions 15 and 18 are delimited by respective cylindrical coupling surfaces 44 and 45, respectively, which, in use, are pressed against the rotating element 4 and the stationary element 3. The second sleeve portion 18 is coated in an elastomeric material. A suitable quantity of water repellent substance is applied to the surface 44, at the second annular segment 32 of the first flange portion 16, to improve sealing.

Figure 2A:
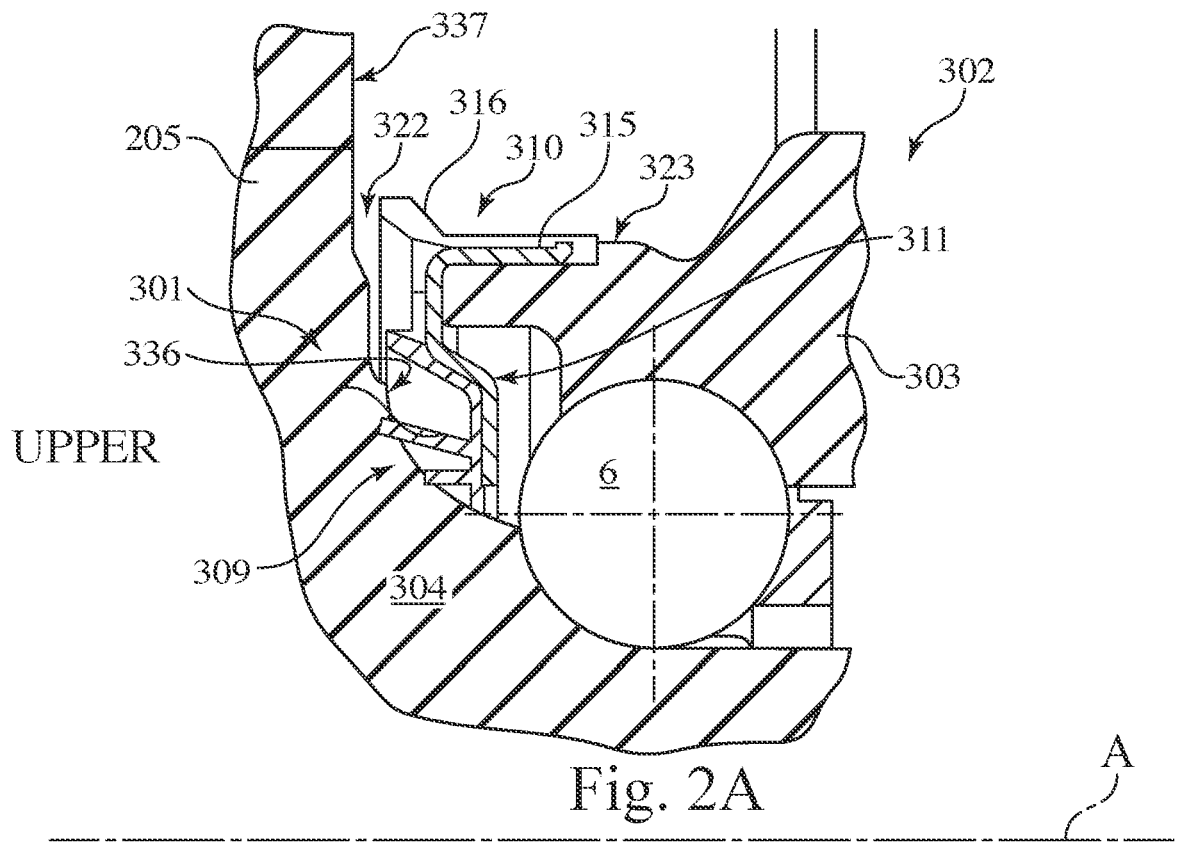
FIGS. 2A-2B schematically shows in radial section a first example embodiment used in the wheel hub unit of FIG. 1.
Figure 2B:
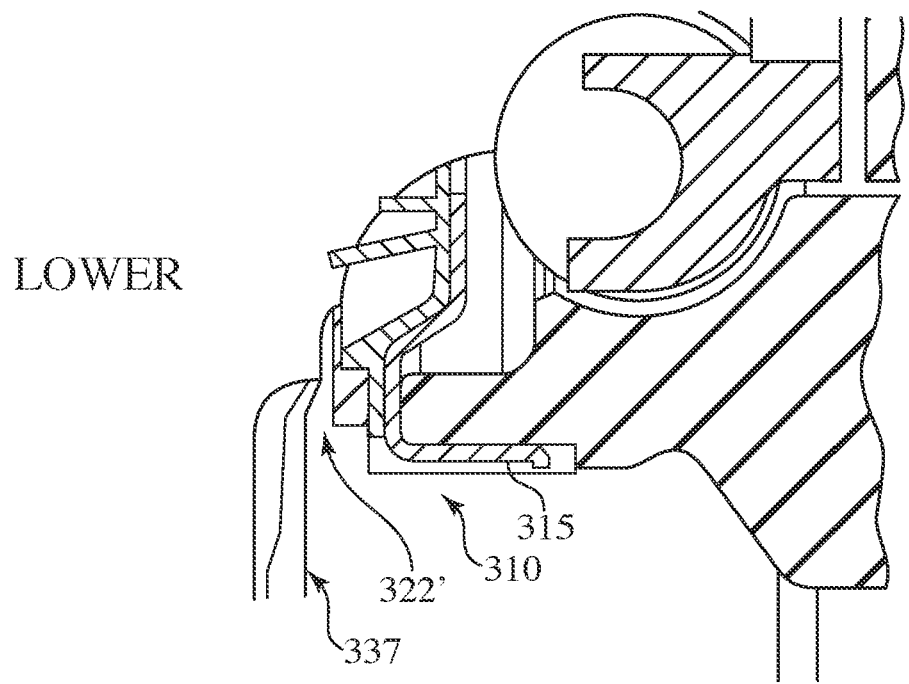

With reference to FIGS. 2A-2B, wheel hub unit 302 is equipped with a sealing assembly 301 similar to the sealing assembly 1 described above and in any case with the same features as the sealing assembly of FIG. 1: labyrinth seals and low friction of the contacting lips with respect to the corresponding sealing surfaces. For convenience, FIGS. 2A-2B also comprise two details, one (UPPER) relating to the upper portion of the wheel hub unit, as shown in FIG. 2A and the other (LOWER) relating to the lower portion of said unit, as shown in FIG. 2B.

The wheel hub unit 302, again of known type, comprises an outer ring 303, stationary in use, an inner ring 304, rotating in use about an axis A, which is also the axis of symmetry of both rings 303 and 304, and at least one row of rolling elements 6 interposed between the outer ring 303 and the inner ring 304, which are mutually coaxial; the ring 304 has a flanged end 305 opposite to the outer ring 303 and intended to carry a vehicle wheel.

The sealing assembly 301 comprises a screen 311, entirely similar to the screen 11 of the sealing assembly 1, except that it is stably mounted on an outer lateral surface 323 of the stationary element 303. The screen 311 carries an annular gasket 309 provided with one or more contacting lips which form a seal by cooperating with a radially inner annular surface 336 of the flanged end 305 of the inner ring 304.

The outer ring 303 is pressed all along the lateral surface 323, being devoid of the shaped annular portion, i.e. the recess 39 of the configuration of FIG. 1. The sealing screen 311, which has an annular lip 310 acting as splash guard protruding towards the flanged end 305 of the inner ring 304 is firmly attached in place of the material eliminated. The annular lip 310 has the function of creating a labyrinth seal 322. In fact, the annular lip 310 is provided with a sleeve portion 315, which is stably fixed to the sealing screen 311, and with a flange portion 316 which is oblique and protrudes towards the flanged end 305 of the inner ring 304. The flange portion 316 cooperates with an annular surface 337 of the flanged end 305 so as to define the labyrinth seal 322.

According to the example embodiments, with reference to the lower portion (LOWER—FIG. 2B) of the wheel hub unit, the interruption of the shield on the lower side of the wheel hub unit is created by cutting out for a predetermined angular width the flange portion 316 of the annular lip 310. In practice, the annular lip 310 in the lower portion of the wheel hub unit will comprise only the sleeve portion 315. Thus, the width of the labyrinth seal 322', in the lower part of the wheel hub unit, will be greater than the width of the labyrinth seal 322 in the upper part of the wheel hub unit, facilitating drainage by gravity of water, mud and contaminants in general.

Figure 3A:
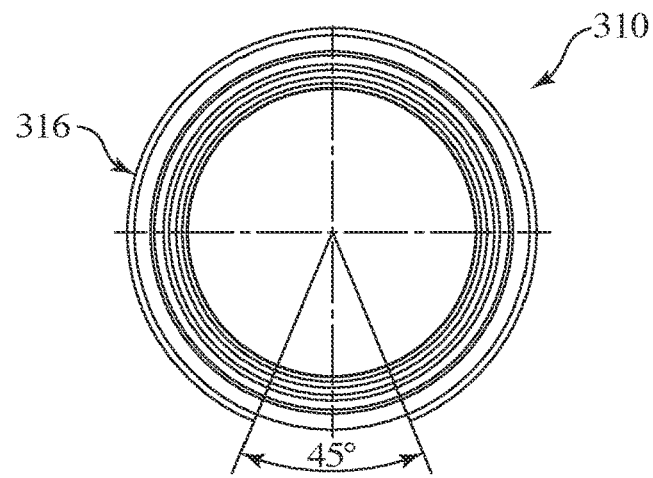
FIGS. 3A-3C schematically show in front view three possible solutions of the example embodiment of FIGS. 2A-2B.
Figure 3B:
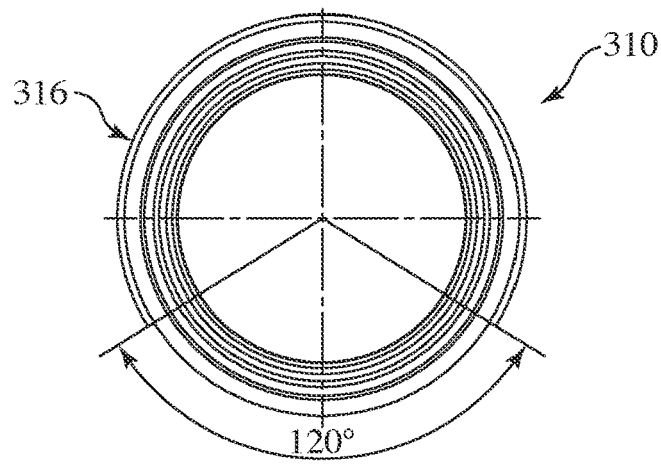
Figure 3C:
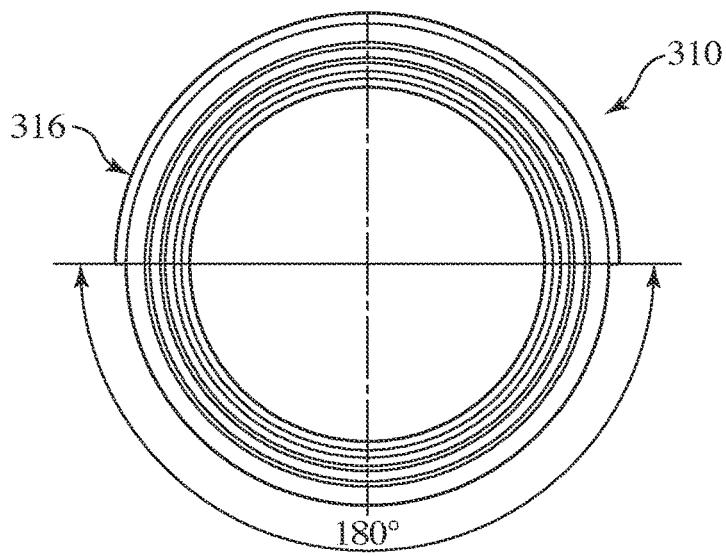

With reference to FIGS. 3A-3B, the flange portion 316 of the annular lip 310 may be cut to various angular widths depending on the specific operating conditions of the wheel hub unit 302. Preferably, also for this embodiment, in operating conditions in which a low accumulation of contaminants is expected, and therefore a lower drainage capacity is needed, the angular width may be of the order of, or approximately, 45° (FIG. 3A). Conversely, in the event of more severe operating conditions, this angular width may be of the order of, or approximately, 120° (FIG. 3B) or even up to 180° (FIG. 3C) thus encompassing the entire lower portion of the wheel hub unit.

All of the embodiments of the example embodiments described hitherto combine the conceptual solution of creating a greater opening of the labyrinth seal in an area, typically the lower part of the wheel hub unit, which is less exposed to the flow of mud.

This thus allows better drainage in an area that is less exposed to the ingress of contaminants yet advantageously allows the mud to flow out simply by gravity. The overall design combines the advantage of protection against the ingress of contaminants in the upper part and at the sides of the wheel hub unit, while at the same time improving drainage on the lower side of the bearing. This optimizes the performance of the wheel hub unit provided with low-friction labyrinth sealing assemblies, in all operating conditions.

It is understood that the is the inventive concepts disclosed herein are not limited to the embodiments described and illustrated, which are to be considered to be examples of implementation of the low-friction sealing assembly, to which further modifications may be made in terms of shape and arrangement of parts, structural details and fitting.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open-ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least"; the term "such as" should be interpreted as "such as, without limitation"; the term "includes" should be interpreted as "includes but is not limited to"; the term "example" or the abbreviation "e.g." is used to provide exemplary instances of the item in discussion, not an exhaustive or limiting list thereof, and should be interpreted as "example, but without limitation"; the term "illustration" is used to provide illustrative instances of the item in discussion, not an exhaustive or limiting list thereof, and should be interpreted as "illustration, but without limitation." Adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

Certain embodiments in accordance with this disclosure provide a wheel hub unit that does not have the disadvantages described above and that can be equipped with a low-friction sealing assembly like that mentioned above or a variant thereof, all of which have in common the fact that they operate with little interference from the rubbing lips and include labyrinth seals and can thus also be defined as low-friction.

Certain embodiments in accordance with this disclosure provide a wheel hub unit with the features set out in the attached claims.

According to certain embodiments in accordance with this disclosure, a labyrinth sealing assembly between the outer ring of the wheel hub unit, stationary in use, and the flange portion of the screen rigidly secured to the inner ring, rotating in use, of the wheel hub unit, or, according to an entirely similar dual variant, a labyrinth sealing assembly between the flanged end of the inner ring and a screen rigidly secured to the outer ring, is provided with an interruption of the shield on the lower side of the wheel hub unit, thereby facilitating drainage of mud by gravity. In particular, the labyrinth seal does not have a circumferential symmetry but comprises an upper portion and a lower portion with respect to a symmetry axis of the wheel hub unit and is provided with an angular interruption of the shield made on its lower portion corresponding to the lower side of the wheel hub unit so as to increase an outflow section thereof from the labyrinth seal itself which facilitates gravity drainage of contaminants present inside the sealing assembly.

These and other objects, features, and characteristics of the present disclosure, as well as the methods of operation and functions of the related elements of structure and the combination of parts, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a," "an," and "the" include plural referents unless the context clearly dictates otherwise.

The invention claimed is:

1. A sealing assembly for sealing a gap between a radially outer ring and a radially inner ring, comprising:
   at least one labyrinth seal,
   an annular lip configured as a splash guard, the sealing assembly comprising a flange portion, wherein the flange portion is oblique and configured to project towards a flanged end of the radially inner ring,
   wherein,
      the at least one labyrinth seal does not have a circumferential symmetry, wherein the at least one labyrinth seal comprises an upper portion and a lower portion with respect to a symmetry axis (A) of the wheel hub unit and is provided with an angular interruption of the flange portion made on the lower portion corresponding to a lower side of the wheel hub unit, the angular interruption of the flange portion is configured to increase an outflow section from the labyrinth seal itself in order to facilitate gravity drainage of contaminants present inside the sealing assembly; the upper portion of the at least one labyrinth seal being defined by the flange portion and an annular surface of the flanged end;
      the annular lip further comprises an axially extending sleeve portion comprising an axial length;
      the angular interruption of the flange portion on the lower portion of the at least one labyrinth seal is defined by the absence of a predetermined angular width of the flange portion of the annular lip, wherein the predetermined angular width is constituted by the sleeve portion alone and the axial length of the sleeve portion is constant in the upper portion and the lower portion of the labyrinth seal.

2. A wheel hub unit comprising:
   a radially outer ring configured to be stationary in use of the wheel hub unit;
   a radially inner ring configured to rotate during use of the wheel hub unit;
   a flanged end of the radially inner ring opposite to the radially outer ring;
   at least one row of rolling elements, interposed between the radially outer ring and the radially inner ring; and
   a sealing assembly, interposed between the radially outer ring and the radially inner ring, the sealing assembly defining at least one labyrinth seal,
   wherein,
      the sealing assembly comprises an annular lip configured as a splash guard, the annular lip comprising a flange portion, wherein the flange portion is oblique and projects towards the flanged end of the radially inner ring,
      the at least one labyrinth seal does not have a circumferential symmetry, wherein the at least one labyrinth seal comprises an upper portion and a lower portion with respect to a symmetry axis (A) of the wheel hub unit and is provided with an angular interruption of the flange portion made on the lower portion corresponding to a lower side of the wheel hub unit, the angular interruption of the flange portion is configured to increase an outflow section from the labyrinth seal itself in order to facilitate gravity drainage of contaminants present inside the sealing assembly; the upper portion of the at least one labyrinth seal being defined by the flange portion and an annular surface of the flanged end;
      the annular lip further comprises an axially extending sleeve portion comprising an axial length;
      the angular interruption of the flange portion on the lower portion of the at least one labyrinth seal is defined by the absence of a predetermined angular width of the flange portion of the annular lip, wherein the predetermined angular width is constituted by the sleeve portion alone and the axial length of the sleeve portion is constant in the upper portion and the lower portion of the labyrinth seal.

3. The wheel hub unit of claim 2, wherein the sealing assembly comprises a screen configured to be stationary in use of the wheel hub unit and mounted stably on an outer lateral surface of the radially outer ring, and being provided with the annular lip.

4. The wheel hub unit of claim 3, wherein the screen is provided with an annular gasket comprising one or more contacting lips which form a seal cooperating with a radially inner annular surface of the flanged end of the radially inner ring.

5. The wheel hub unit of claim 4, wherein the the sleeve portion is configured to be stably fixed to the screen.

6. The wheel hub unit of claim 3, wherein the the sleeve portion is configured to be stably fixed to the screen.

7. The wheel hub unit of claim 2, wherein the angular width of the cutout of the flange portion of the annular lip is 45° or 120° or 180°.

\* \* \* \* \*